United States Patent [19]
Holmes et al.

[11] Patent Number: 5,206,703
[45] Date of Patent: Apr. 27, 1993

[54] METHOD OF AND APPARATUS FOR MEASURING SMALL GAPS

[75] Inventors: Christopher S. Holmes, Keighley; Robert G. Munro, Huddersfield; Stanley Eastwood, Rochdale, all of England

[73] Assignee: Renold Power Transmission Ltd., Wythenshawe, England

[21] Appl. No.: 570,229

[22] Filed: Aug. 21, 1990

[30] Foreign Application Priority Data

Aug. 25, 1989 [GB] United Kingdom ............... 8919399

[51] Int. Cl.⁵ .................. G01B 11/00; G01B 11/22; G01B 11/02
[52] U.S. Cl. .................................. 356/372; 356/378; 356/384
[58] Field of Search ............... 356/372, 373, 375, 376, 356/379, 378, 381, 384, 388, 391, 392, 386, 387, 394; 250/560, 570, 571, 561

[56] References Cited

U.S. PATENT DOCUMENTS

| | | | |
|---|---|---|---|
| 2,485,355 | 10/1949 | Brennan | 356/392 |
| 3,102,960 | 9/1963 | Sick | 356/394 |
| 3,746,455 | 7/1973 | Flamholz | 356/378 |
| 3,809,907 | 5/1974 | Schuller et al. | 356/381 |
| 4,399,861 | 8/1983 | Carlson | 356/387 |
| 4,659,937 | 4/1987 | Cielo et al. | 250/560 |
| 4,687,328 | 8/1987 | Shiraishi et al. | 356/384 |
| 4,695,233 | 9/1987 | Miyoshi et al. | |
| 5,008,556 | 4/1991 | Mersch | 356/372 |

FOREIGN PATENT DOCUMENTS

| | | |
|---|---|---|
| 0157431 | 10/1985 | European Pat. Off. |
| 973802 | 8/1960 | Fed. Rep. of Germany |
| 61-132806 | 6/1986 | Japan |
| 63-117204 | 5/1988 | Japan |
| 492196 | 6/1970 | Switzerland |

OTHER PUBLICATIONS

"Pin Gauges" German Metrology Equipment Manufacturer, Mahr, pp. 185–186.
Optical Technology—"Double Perflectomefer" for Measuring Small Holes Diameters, vol. 38, No. 1 pp. 28–321; Jan. 1974; Vesnina et al.

*Primary Examiner*—Richard A. Rosenberger
*Assistant Examiner*—Hoa Q. Pham
*Attorney, Agent, or Firm*—Frishauf, Holtz, Goodman & Woodward

[57] ABSTRACT

A technique for measuring a small gap, in particular the clearance gap between the lobes of the rotors of a screw compressor. Light is directed through the gap, and the amount of paraxial light passing through the gap is measured, with the gap width being related to the measured amount of light. The light is directed at the pitch line helix angle into the rotor clearance gap, and the paraxial light is measured by means of an area scan camera.

28 Claims, 7 Drawing Sheets

METHOD OF AND APPARATUS FOR MEASURING SMALL GAPS

This invention is concerned with measuring small gaps and is particularly concerned with measuring the clearance gap between the rotors of a screw compressor.

BACKGROUND OF THE INVENTION

Since their introduction in the 1950's screw compressors have steadily become more important as sources of compressed air and gas. Essentially a screw compressor incorporates an air end having a housing with inlet and delivery ports and containing a pair of rotors having intermeshing helical lobes. Rotation of the rotors induces gas provided at the inlet port which is subsequently compressed in an axially moving progressively reducing helical space and delivered at the delivery port. A critical factor in the efficiency of screw compressors is the rotor clearance gaps between the rotors which although necessary as a running clearance does allow gas leakage. Very approximately a reduction of 0.01 mm in the clearance increases efficiency by one per cent.

From this it can be seen that very accurate manufacture is required but methods of inspecting and checking the clearance gap have not kept pace with the demands placed upon them. In fact the only shop floor method available for measuring the clearance gap typically in the range zero to 100 microns is by use of feeler gauges which can enter the curved clearance spaces and detect the points of minimum clearance.

However, the use of feeler gauges is very dependent on the human factor and it is generally felt that the method is insufficiently accurate for modern requirements.

It is therefore an object of the present invention to provide an improved method of measuring small gaps in general and the rotor clearance gaps of screw compressors in particular.

The present invention is a method of measuring a gap comprising directing a beam of light towards the gap, measuring the amount of paraxial light passing through the gap and determining the width of the gap from the measured amount of paraxial light.

The present invention is also a method of measuring the rotor clearance gap between the rotors of a screw compressor comprising directing a beam of light parallel to the pitch line helix angle towards the gap, measuring the amount of paraxial light passing through the gap and determining the width of the gap from the measured amount of paraxial light.

The present invention is further apparatus for measuring a gap comprising a light projector for generating a beam of light, a detector system including a detector for measuring the amount of paraxial light falling thereon and means for determining from the measured amount of paraxial light the width of a gap located between the projector and the detector system, the detector system including means for focusing an image of the gap on the detector.

Embodiments of the present invention will now be described, by way of example, with reference to the accompanying drawings, in which.

Figure 1:
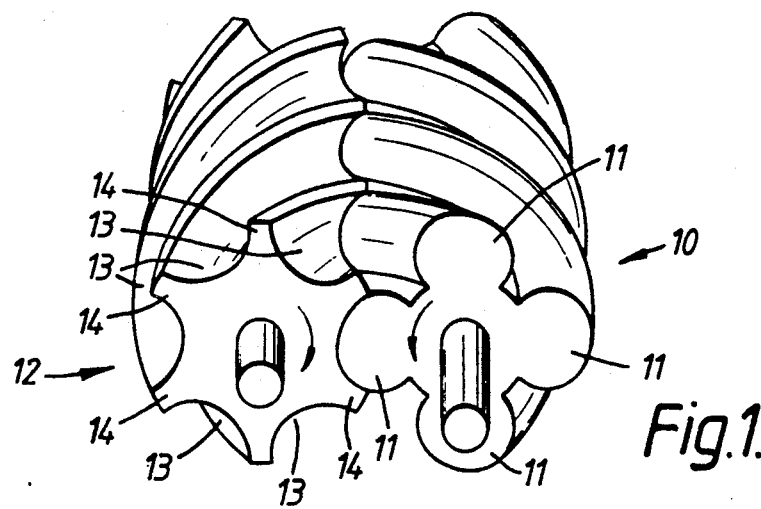
FIG. 1 is a perspective view of a pair of rotors of a screw compressor.
Figure 2:
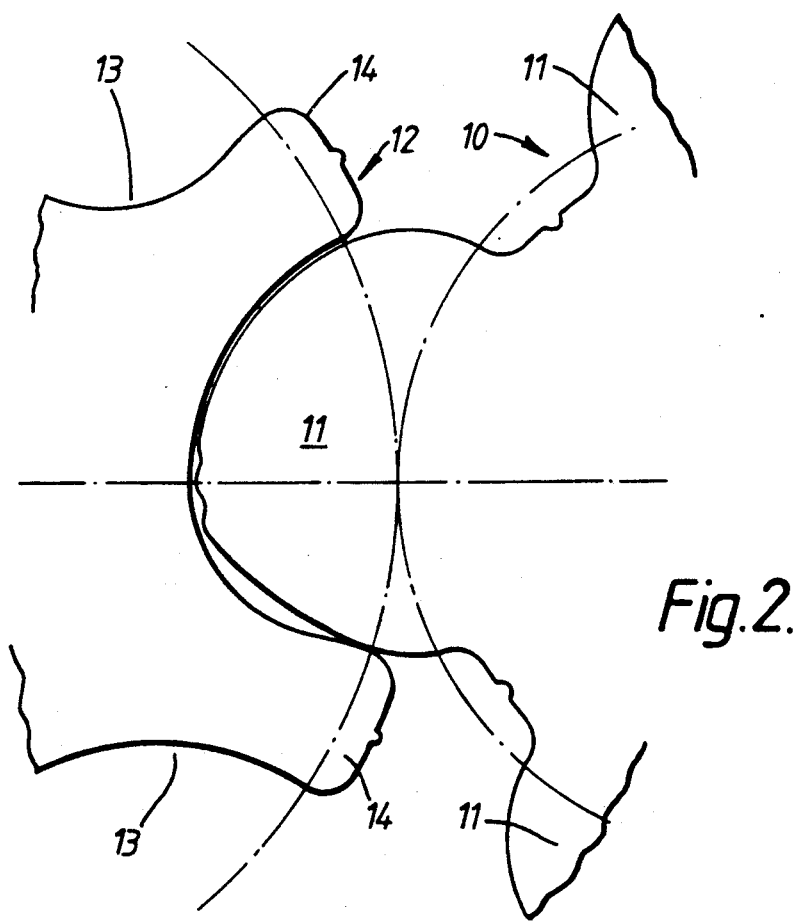
FIG. 2 is a transverse section through the intermeshing rotors of FIG. 1.

Referring now to the drawings, FIG. 1 shows a pair of rotors 10 and 12 from a screw compressor. The male rotor 10 has helical lobes 11 engaging helical flutes 13 in the female rotor 12, the flutes 13 being separated by lobes 14. As can be seen from FIG. 2 the shape of both lobes and flutes is complicated and typically consists of a combination of circular arcs, straight lines and mutually generated sections. Given this complicated shape the applicants have appreciated that it can be proved from the properties of conjugacy that no matter what the details of the design of lobes and flutes, there always exists a straight line of sight through the clearance gap between the rotors, and that this line of sight is always parallel to the pitch line helix angle.

Figure 3A:
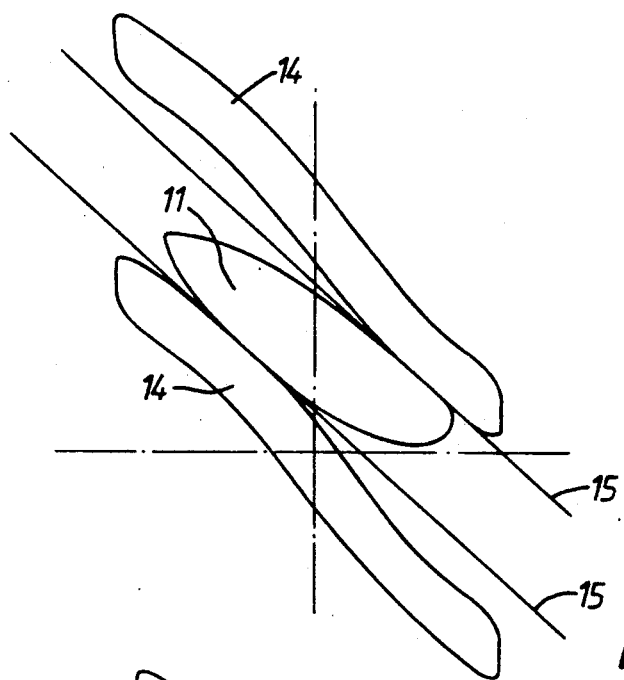
FIGS. 3a, 3b and 3c are different sections through adjacent male and female rotor lobes in planes parallel to the axis.
Figure 3B:
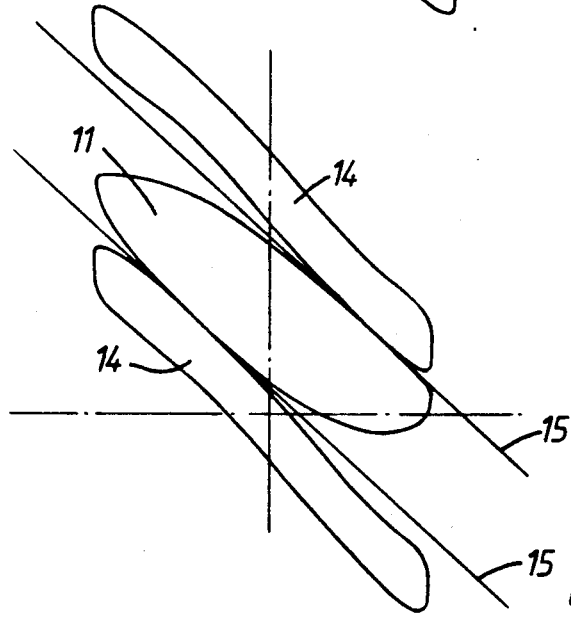
Figure 3C:
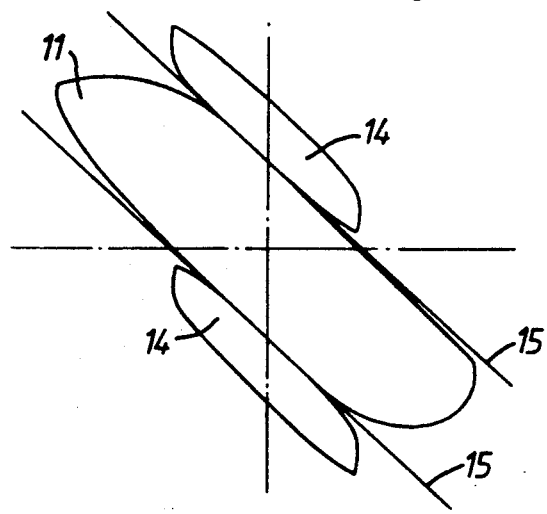

This is illustrated in FIGS. 3a to 3c which are successive sections through a typical pair of intermeshing rotors at increasing distances from the axis of the female rotor respectively. In all three sections a line of sight 15 exists on each side of the lobe 11 of the male rotor, the lines of sight being parallel to the pitch line helix angle.

Figure 4:
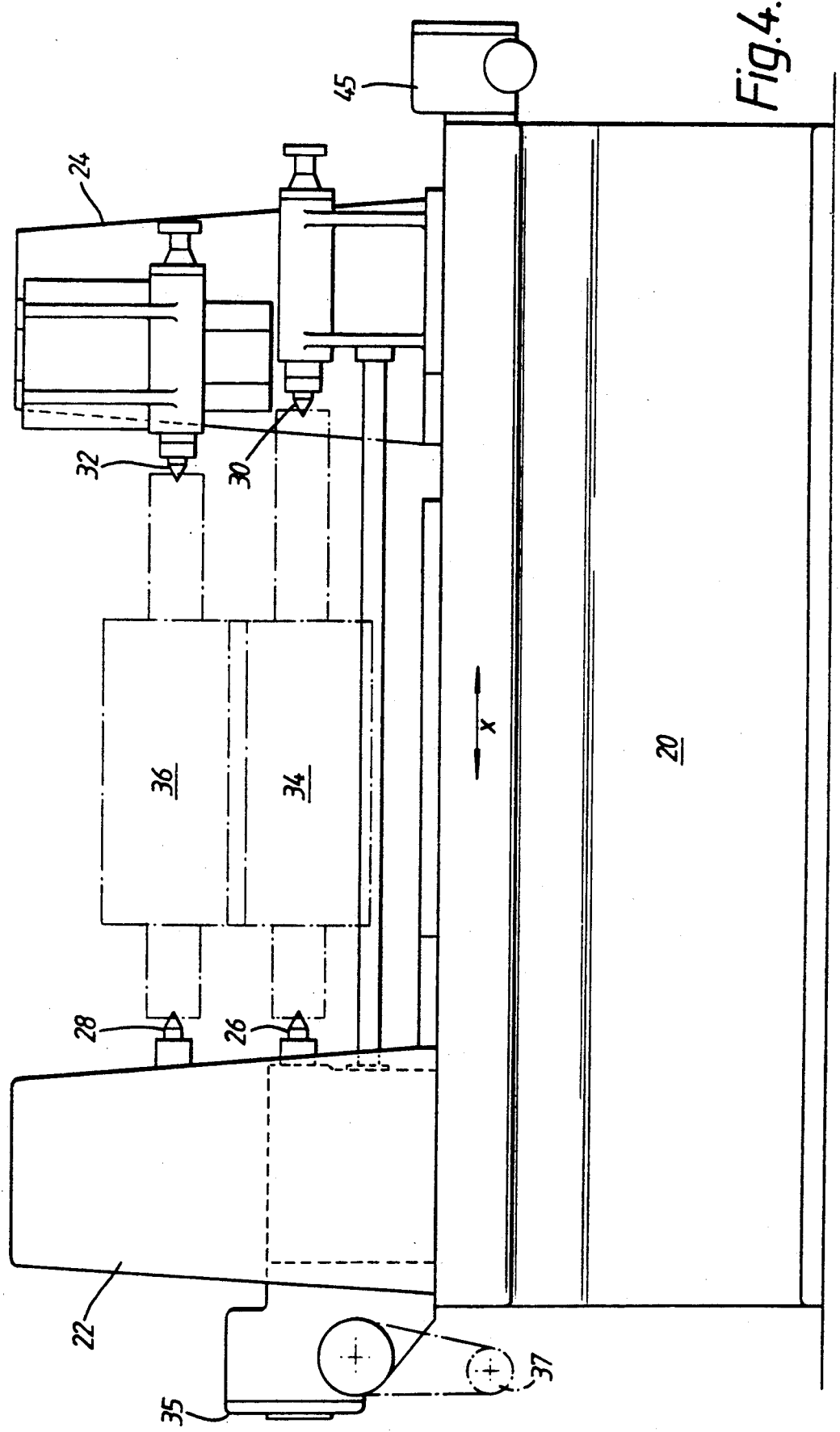
FIG. 4 is a side elevation of a machine for measuring rotor clearance gaps.
Figure 5:
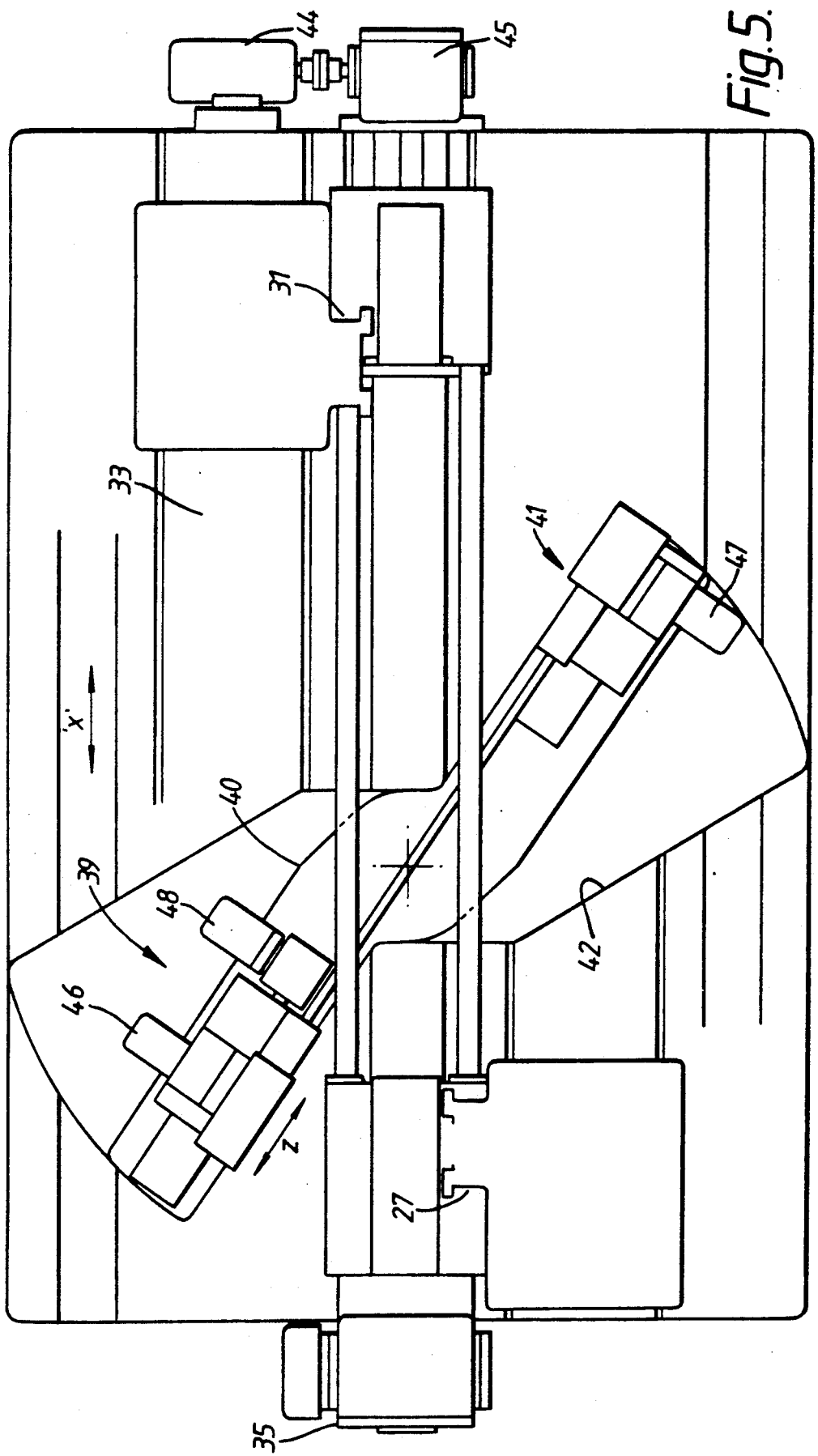
FIG. 5 is a plan view of the machine of FIG. 4.

FIGS. 4 and 5 illustrate a machine for utilising this line of sight to measure the rotor clearance. The machine has a base 20 on which is a moveable headstock 22 and a moveable tailstock 24. There is a centre 26 of fixed height in a housing bolted to the base and a matching centre 30 of fixed height in a moveable housing. The headstock 22 is provided with an upper centre 28 which is mounted on a vertical slide 27 while the tailstock 24 has a matching centre 32 which is also vertically adjustable on a slide 31. Thus by adjusting the height of the centres 28 and 32 above the fixed centres, rotors 34 and 36 of different diameters can be mounted between the pair of centres. In practice collets are provided between the centres and the rotors but the collets are not illustrated in FIG. 4 for reasons of clarity.

The headstock 22 and tailstock 24 are mounted on a slide 33 on the base 20 to be moveable in the 'x' direction towards and away from the centre 26. Centre 30 is also moveable along the base 20 in the 'x' direction. They thus provide the adjustment necessary to accommodate different lengths of rotor. The proper positioning of the centres 28 and 32 vertically relative to the centres 26 and 30, and of the headstock 22, tailstock 24 and centre 30 horizontally to accommodate a particular pair of rotors 34 and 36 properly meshed is effected manually.

The fixed centre 26 is driven through a gearbox 35 by a servo-motor (indicated at 37 in FIG. 4) to rotate the rotor 34, a digital output rotary transducer (not illustrated) being associated with the rotor 34. This movement as will be explained later is accurately controlled by a computer utilising the feedback signal from the rotary transducer.

An optical unit is mounted on the base 20 between the headstock 22 and the tailstock 24 and consists of a light projector 39 mounted on a frame 40 and lying on one side of the rotors 34 and 36, and a light detector system 41 mounted on the frame 40 on the other side of the rotors 34 and 36.

The frame 40 is mounted on a subframe 42 for rotation about a vertical pivotal axis and the subframe in turn is mounted on a slide on the base 20 to be moveable parallel to the rotor axis in the x direction (FIG. 4) by means of a leadscrew driven by a servo-motor 44 through a gearbox 45. Again operation of the motor is controlled by the computer previously mentioned utilising the digital output of a linear transducer (not illustrated) associated with the position of the subframe 42 along the rotor axis.

Figure 6:
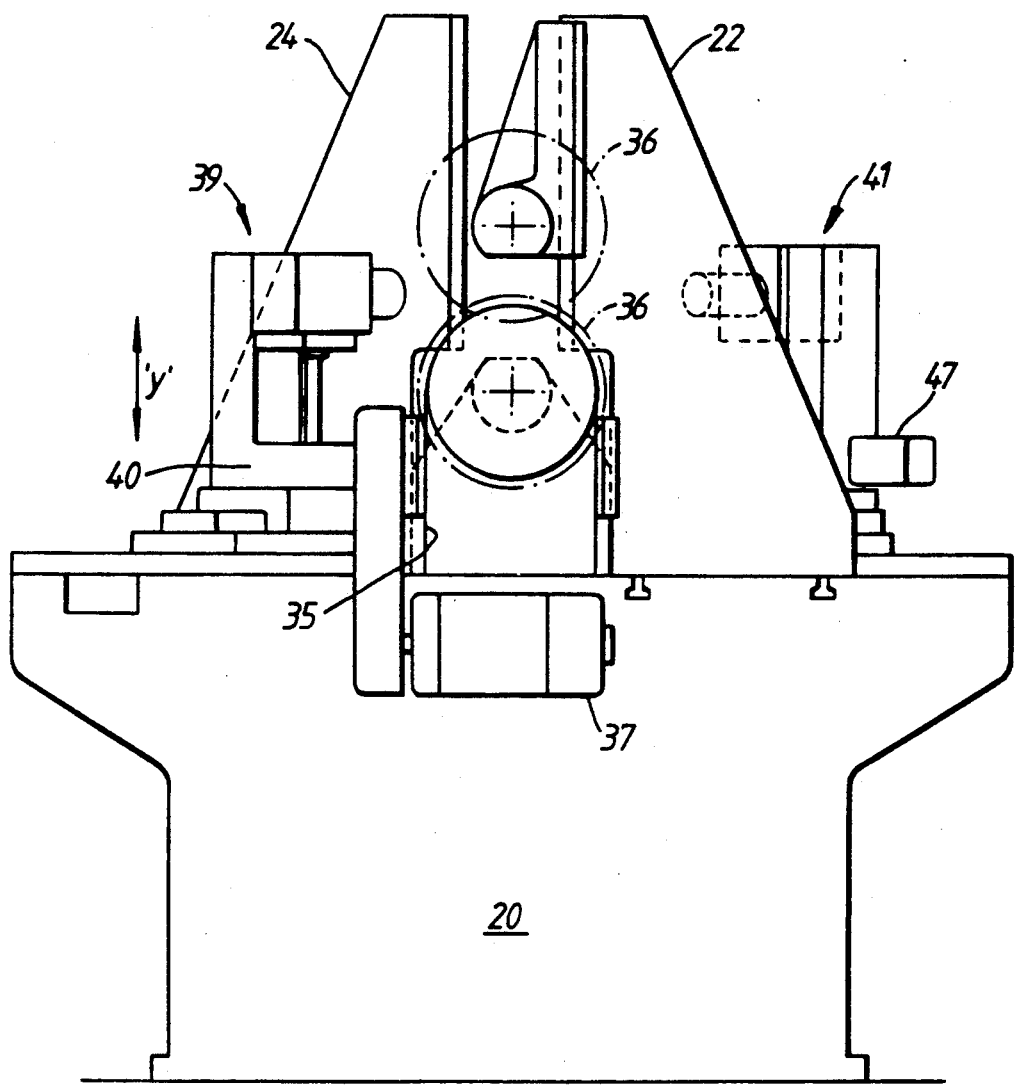
FIG. 6 is an end elevation of the machine of FIGS. 4 and 5.

The projector 39 and system 41 are mounted for movement together relative to the frame 40 both vertically (the y direction, see FIG. 6) and along the line of sight between them (the z direction, see FIG. 5). The vertical movement is controlled by synchronised servo-motors 46 and 47, while the single servo-motor 48 controls movement along the line of sight. The motors 46, 47 and 48 are also controlled by the computer previously mentioned, again utilising the digital outputs of linear transducers (not illustrated) associated with the various movements.

In use the frame 40 is adjusted on the subframe 42 by means of an angle gauge so that the line of sight is inclined to the rotor axis at the pitch line helix angle of the rotors. The servo-motors 44, 46, 47 and 48 are then used to adjust the position of the projector 39 and detector system 41 so that the light beam from the projector is focussed on a first selected point in the rotor clearance gap between two rotors to enable the measurement of the gap at that point. Thereafter the motors are energised by the computer according to a preset programme to present in succession selected points in the rotor clearance gap for measurement. It should be understood that the gap appears to the optical system as a wavy line consisting of a succession of gaps between different lobes and flutes and the pattern of measurements typically involves ten measurements per wave.

When the selected points of the clearance gap of the first engagement have been measured, the motor 37 is energised to rotate and present the clearance gap of the next engagement or lobe/flute combination for measurement in the same way.

It should also be understood that as the male and female rotors usually have different numbers of lobes a considerable number of clearance gaps need to be measured. For example, if one rotor has four lobes and the other five, then the clearance gaps produced in twenty engagements require to be measured.

Figure 7:
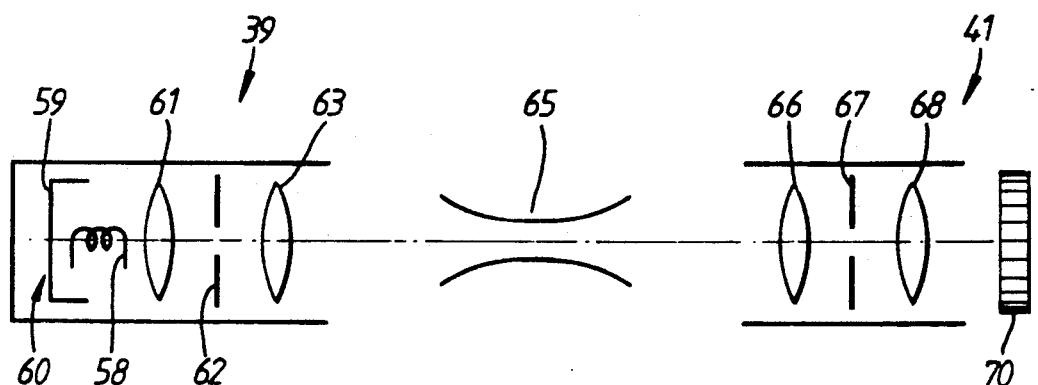
FIG. 7 is a diagrammatic illustration of the optical system of the machine of FIGS. 4 to 6.

The optical system is shown in FIG. 7. Light from a source 60 (in this embodiment a filament 58 and a reflector 59) passes through a first lens 61 which focusses an image of the source 60 at an aperture 62 which then appears as a bright uniform spot of light. An image of this aperture 62 is focussed by a lens 63 into the gap 65. The elements described thus far constitute the light projector 39 of FIGS. 5 and 6. Light from the gap 65 is collected by a lens 66 and passed through a pinhole aperture 67 at the back focal point which acts as a telecentric filter and blocks non-paraxial light rays. This is important as it is necessary to eliminate as far as possible light passing through the gap 65 by reflection from the surfaces defining the gap. Lens 68 forms an image of the gap on a photo-electric detector 70. These elements to the right of the gap 65 in FIG. 7 constitute the light detector system 41 of FIGS. 5 and 6.

In the context of an optical system which permits only light passing from the source axially through the gap to reach the detector, the amount of light reaching the detector 70 is a measure of the gap width. In its most fundamental form therefore the detector 70 could be a single photo-sensitive element extending at right angles across the image of the gap to provide an analog output signal which, subject to a suitable calibration factor, would be a measurement of the gap. This simple system however has two major disadvantages; firstly no image can be provided for visual inspection by the operator so that the presence of foreign bodies such as dust, fluff or oil drops cannot be detected, leading to false readings, and secondly no information regarding the position of the gap image on the detector is available. It should also be noted that it is necessary to have the axis of the photosensitive element extending at right angles across the image of the gap and this involves an adjustment for each successive measurement as the angle of the gap changes for each measurement round of a lobe. The adjustment is not difficult as the necessary angles of the gaps and thus of the photosensitive element are known in advance and could in any event be determined by the simple expedient of adjusting the angle of the photosensitive element until its output is a minimum. The fact remains however that a further adjustment is necessary for each measurement.

A slightly more sophisticated system involves a detector 70 in the form of a linear array of photosensitive elements. This has the advantage over the single photosensitive element that the position of the image relative to the detector can be determined, but there is still no pictorial image available for operator inspection and the array must extend at right angles across the image of the gap. In the preferred optical system the elements 66, 67, 68 and 70 comprise a lens and camera system in which the detector 70 comprises a pixel array, each pixel being a separate charge coupled device (CCD) photo-sensor. A Pulnix TM760 camera available from Pulnix America Inc. of California is such a camera and provides the CCD system as a 512×512 array of square 13 micron pixels as its detector 70.

Such a detector 70 allows a picture of the gap to be displayed for visual inspection, allows any desired positional information to be generated and does not require rotation of the camera to correct for the angle of the image.

The optical systems described above can be modified by substituting a laser for the elements 58 to 63. Such a system however does not permit the formation of a recognisable image of the gap because of the coherent nature of laser light.

In all the optical systems described above it is necessary to focus the light from the camera projector assembly 39 and 41 on the gap 65. This is basically done by a programme which is loaded in the computer 90 and is based on knowledge of the rotor geometry and thus of the position of the clearance gaps, the programme controlling the servo-motor 48. It is preferred also to have a system of fine focussing and this may be most conveniently done by an autofocussing system in which the servo-motor 48 is energised to maximise the brightness of the image falling on the detector 70. There is thus provided a system of coarse focussing by means of the computer programme and a system of fine focussing by means of the autofocussing system.

Figure 9:
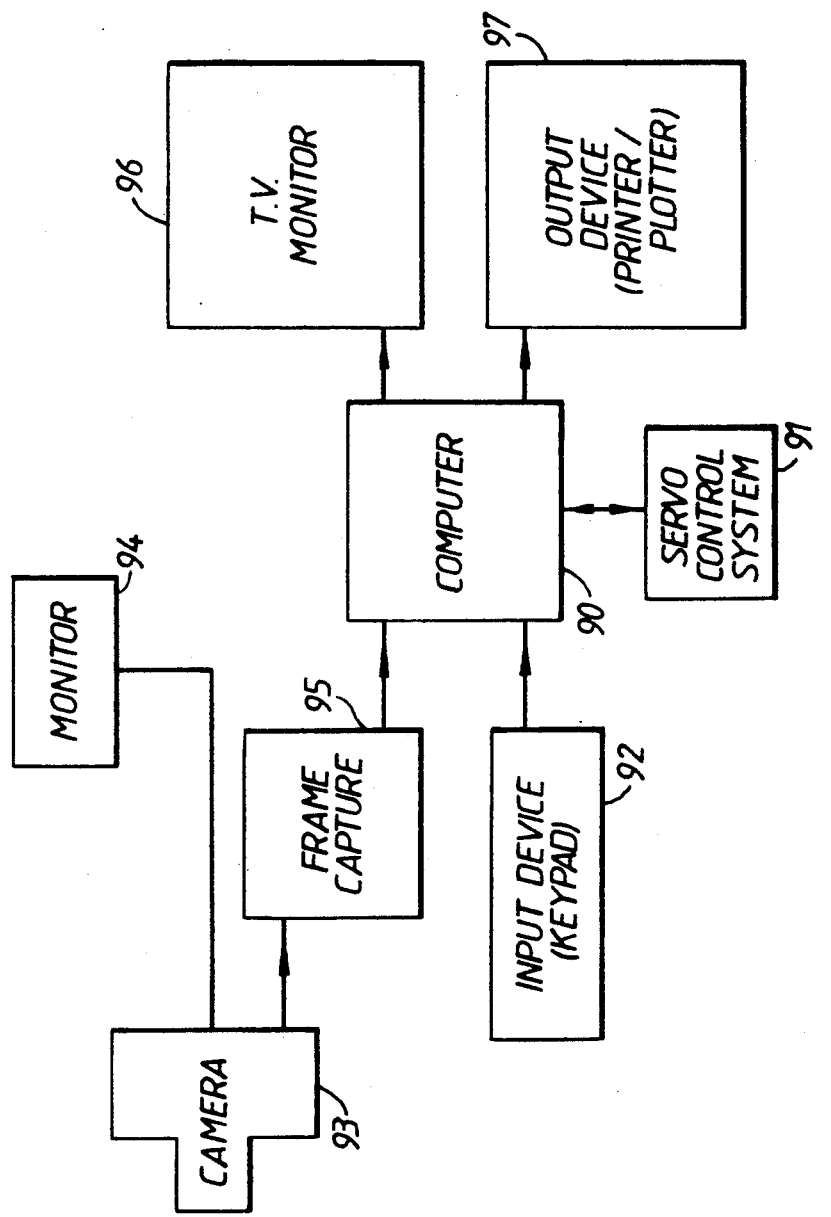
FIG. 9 is a block diagram of the control circuit used with the system of FIG. 1.

In FIG. 9 is shown the basic control system at the heart of which lies a computer 90 which controls the operation of the various servo-motors 37, 44, 46, 47 and 48, the servo-motors and associated transducers being indicated collectively by the reference 91 in FIG. 9. The computer is programmed with the necessary information for each of the rotor types or designs to be checked, this information including the selected measurement points for each lobe combination, the rotation of the rotors to present another lobe combination for measurement, the number of lobe combinations and the appropriate calibration factors. Connected to the computer is an input device such as a keypad 92 by means of which the operator can enter the type of rotor, the information enabling the proper calibration factor to be selected by the computer, and instructions to the computer to effect a measurement and move onto the next measurement.

Signals from the detecting device, in this preferred embodiment a camera 93 as previously discussed, are fed directly to a monitor 94 which displays to the operator an image of the gap allowing the operator to check for dirt, fluff, oil and similar foreign bodies which lead to spurious readings and through a frame capture circuit 95 to the computer 90. The frame capture circuit 95 is a conventional circuit which accepts the signals for one frame from the pixel array in the camera and presents them to the computer 90. The computer utilises these signals in accordance with a software programme to detect the direction of the gap and measure the light intensity across the gap, i.e. at right angles to the gap direction. This is preferably done by taking the minimum value of a number of multiple scans as this corresponds to the narrowest gap present. The light distribution across the gap is substantially Gaussian as shown in FIG. 8 which plots intensity against distance across the gap.

Figure 8:
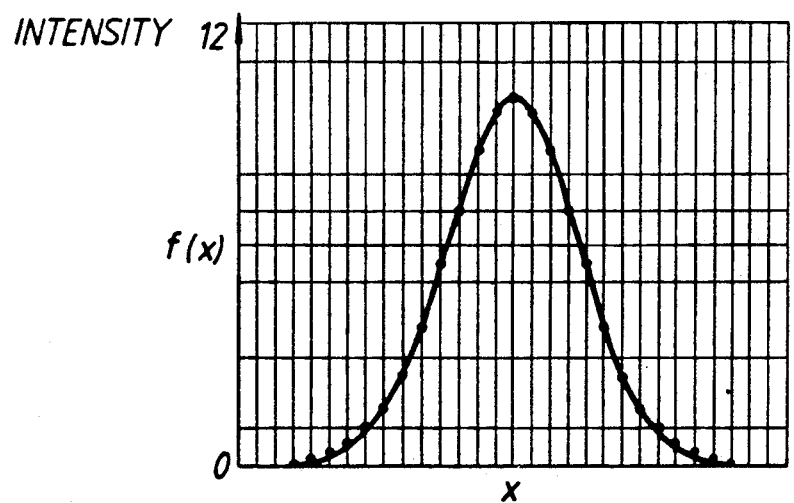
FIG. 8 illustrates the light intensity distribution across the image of the gap provided by the optical system of FIG. 7.

The total amount of light passing through the gap, corresponding to the area under the curve in FIG. 8, is calculated, the appropriate calibration factor is applied and the corresponding gap size selected for display on the monitor 96 along with such other information as may be desired, e.g. the image of the gap and/or the intensity curve of FIG. 8.

When the measurement has been recorded the computer, on instruction from either the operator via the keypad or the programme, activates the servo-motors and utilises the digital feedback signals from the transducers to move the optical system and position it for the next programmed measurement. A hard copy of the measurements recorded can be made available from an output device, in this case a printer 97. As previously indicated, autofocussing is desirable and may be achieved by maximising the brightness of the centre of the image, i.e. measuring the peak value of FIG. 8. Alternatively the system would work by maximising the slope of the curve of FIG. 8.

Mention has been made of the calibration factor applied by the computer to the measured value. This calibration factor is necessary to take account of errors introduced by factors such as the curvatures of the surface defining the gap, the roughness of those surfaces, the lay direction of the surface roughness and the material from which the rotors are made. It has been found helpful in reducing the errors due to surface roughness and lay direction to oil the surfaces lightly, but the other factors still require compensation.

We claim:

1. A method of measuring a gap comprising the steps of:
   (a) focusing a beam of light on the gap, which is less than 100 microns in width,
   (b) substantially eliminating non-paraxial light passing through the gap by means of telecentric filtering,
   (c) measuring the amount of substantially only paraxial light passing through the gap,
   (d) and determining the width of the gap from the measured amount of paraxial light.

2. A method as claimed in claim 1, wherein the measuring step comprises forming an image of the gap on a detector.

3. A method of measuring a gap between a pair of engaged conjugate helicoids having a pitch line helix angle, said method comprising the steps of:
   (a) directing a beam of light through said gap between the pair of engaged conjugate helicoids and parallel to the pitch line helix angle,
   (b) measuring the amount of light passing through the gap, and
   (c) determining the width of the gap from the measured amount of light.

4. A method as claimed in claim 3, wherein said pairs of engaged conjugate helicoids are rotors of a screw compressor.

5. A method as claimed in claim 3, in which the gap is less than 100 microns in width.

6. A method as claimed in claim 3, wherein said directing step comprises focusing the beam of light on the gap.

7. A method as claimed in claim 3, wherein the steps of measuring light and determining the gap width therefrom utilize substantially only paraxial light passing through said gap.

8. A method as claimed in claim 3, wherein the measuring step comprises eliminating non-paraxial light passing through the gap by means of telecentric filtering.

9. A method as claimed in claim 3, wherein the measuring step comprises forming an image of the gap on a detector.

10. A method as claimed in claim 9, wherein the detector is a linearly extending detector, and further comprising the step of adjusting the detector to extend across the image of the gap at right angles thereto.

11. Apparatus for measuring a gap which is less than 100 microns in width, comprising:
    (a) a light projector means for generating a beam of light and focusing it on said gap which is less than 100 microns in width,
    (b) a detector system including detector means for measuring the amount of substantially only paraxial light from said light projector means falling thereon,
    (c) telecentric filtering means for intercepting non-paraxial light before it reaches the detector, and
    (d) means for determining from the measured amount of substantially only paraxial light the width of the gap located between the projector means and the detector system, the detector system including means for focusing an image of the gap on the detector means.

12. Apparatus as claimed in claim 11, wherein the detector is a linear detector means, and said apparatus further comprising means for rotating the detector means to lie across the image of the gap at right angles thereto.

13. Apparatus as claimed in claim 11, wherein the detector comprises a rectangular pixel array, and said apparatus further comprising computer means for calculating from the output of the pixels of the array the distribution of light intensity across the image of the gap at right angles thereto.

14. Apparatus as claimed in claim 13, wherein the computer means includes means for calculating the total amount of light falling on an area of the detector means extending across the image of the gap at right angles thereto.

15. An apparatus for measuring a gap between a pair of engaged conjugate helicoids having a pitch line helix angle, comprising:
   (a) means for directing a beam of light through said gap between the pair of engaged conjugate helicoids and parallel to the pitch line helix angle,
   (b) means for measuring the amount of light passing through said gap, and
   (c) means for determining the width of said gap from the measured amount of light.

16. Apparatus as claimed in claim 15, wherein said pairs of engaged conjugate helicoids are rotors of a screw compressor.

17. Apparatus as claimed in claim 15, further including means for mounting the pair of engaged conjugate helicoids, and wherein:
   (a) the means for directing the beam of light is a light projector mounted to one side of the gap between the lobes of said conjugate helicoids,
   (b) the means for measuring the amount of light is a detector system mounted on the other side of said gap, on a common axis with the projector means, and
   (c) means is provided for adjusting the common axis to be parallel to the pitch line helix angle of the conjugate helicoids.

18. Apparatus as claimed in claim 17, wherein the directing means comprises means for moving the light projector means and detector system parallel to the rotor axes, and at right angles to the rotor axes.

19. Apparatus as claimed in claim 17, wherein the directing means comprises means for focusing a light beam from the light projector means on the gap.

20. Apparatus as claimed in claim 17, wherein the detector system includes telecentric filtering means for intercepting non-paraxial light before it reaches the detector.

21. Apparatus as claimed in claim 17, wherein the measuring means comprises means for forming an image of the gap on the detector.

22. Apparatus as claimed in claim 21, wherein the detector is a linear detector means, and said apparatus further comprising means for rotating the detector means to lie across the image of the gap at right angles thereto.

23. Apparatus as claimed in claim 21, wherein the detector comprises a rectangular pixel array, and further comprising computer means for calculating from the output of the pixels of the array the distribution of light intensity across the image of the gap at right angles thereto.

24. Apparatus as claimed in claim 23, wherein said computer means includes means for calculating the total amount of light falling on an area of the detector means extending across the image of the gap at right angles thereto.

25. Apparatus for measuring a gap which is less than 100 microns in width, comprising:
   a light projector means for generating a beam of light and directing it through said gap which is less than 100 microns in width, a detector system including a detector means for measuring the amount of substantially only paraxial light from said light projector means falling thereon, and means for determining from the measured amount of paraxial light the width of said gap located between the projector means and the detector system, the detector system including means for focusing an image of the gap on the detector means;
   means for mounting a pair of engaged conjugate helicoids having a pitch line helix angle;
   means for mounting said light projection means to one side of the gap between the pair of said engaged conjugate helicoids;
   means for mounting the detector system on the other side of said gap, on a common axis with the projector means; and
   means for adjusting the common axis to be parallel to the pitch line helix angle of said helicoids.

26. Apparatus as claimed in claim 25, wherein said pair of engaged conjugate helicoids comprise a pair of inter-engaging screw compressor rotors, and wherein said adjusting means comprises means for moving the light projector means and the detector system parallel to the rotor axes, and at right angles to the rotor axes.

27. Apparatus as claimed in claim 26, further comprising means for focusing a light beam from the light projector means on the gap.

28. Apparatus as claimed in claim 25, further comprising means for focusing a light beam from the light projector means on the gap.

* * * * *